F. E. GRIFFETH.
HARNESS ATTACHMENT.
APPLICATION FILED SEPT. 9, 1913.

1,212,765.

Patented Jan. 16, 1917.

Witnesses
Paul M. Hunt
J. W. Michael, Jr.

Inventor
Francis E. Griffeth
By Edson Bros,
Attorneys

UNITED STATES PATENT OFFICE.

FRANCIS E. GRIFFETH, OF ATHENS, GEORGIA.

HARNESS ATTACHMENT.

1,212,765. Specification of Letters Patent. Patented Jan. 16, 1917.

Application filed September 9, 1916. Serial No. 788,924.

*To all whom it may concern:*

Be it known that I, FRANCIS E. GRIFFETH, a citizen of the United States, residing at Athens, in the county of Clarke and State of Georgia, have invented certain new and useful Improvements in Harness Attachments; and I do hereby declare the following to be a full, clear, and exact description of the invention, such as will enable others skilled in the art to which it appertains to make and use the same.

This invention is a harness attachment, adapted more particularly for use in connection with parts of harness which permit of the ready attaching and detaching of horses to and from vehicles, such as is disclosed in my prior Patent No. 883,144, dated March 24, 1908.

One purpose of the invention is to provide a simple, inexpensive and efficient device, which will give sufficient elasticity to the draft of the animal and at the same time withstand the strain imposed on the parts. Furthermore, in using the draft equalizing device on the hame or a breast strap, it affords a direct or straight line of draft from the animal's shoulders thereby eliminating the frictional wear frequently caused by angular connection with the hame tug previously employed in devices of this character.

With these ends in view, and such others as pertain to a device of this character, the invention consists in the combination and arrangement of parts as herein shown and described and more particularly pointed out in the claims.

In the accompanying drawing, I have illustrated the preferred embodiment of the invention, wherein,—

Figure 1:
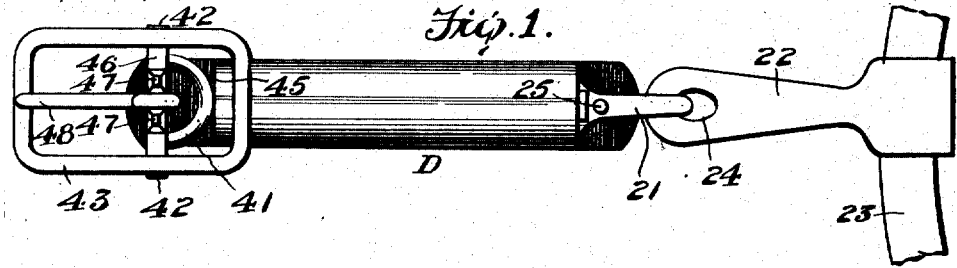
Figure 2:
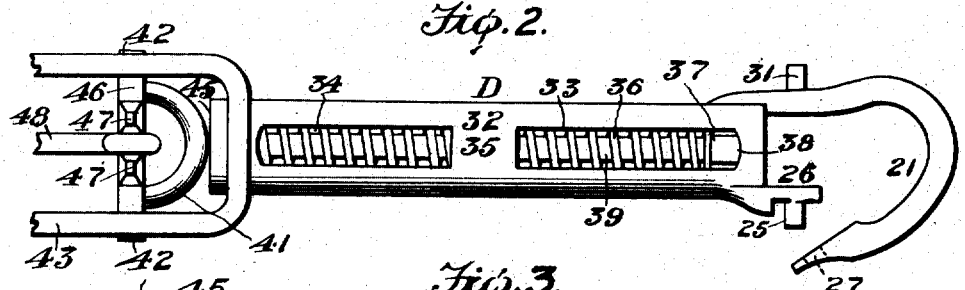
Figure 3:
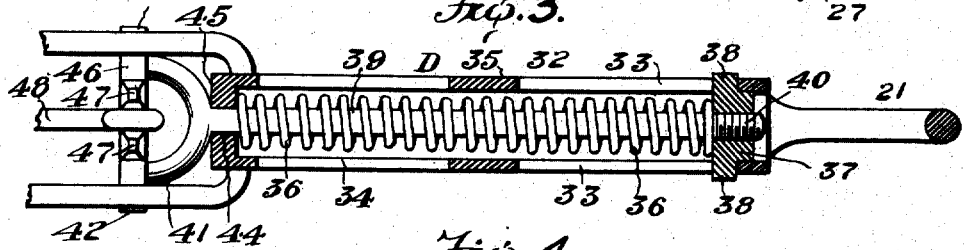
Figure 4:
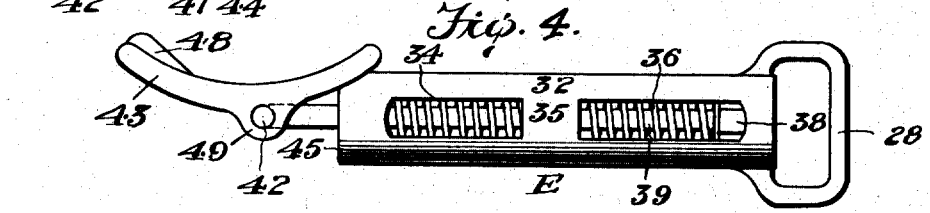

Figure 1, is a view of the attachment employed as a hame tug. Fig. 2, is a plan view of the attachment as disclosed in Fig. 1, with the cover removed and the loop in its open position. Fig. 3, is a sectional view through the hame tug of Fig. 1. Fig. 4, is a plan view of another embodiment of the attachment or tug for use with a breast strap, and Fig. 5, is a side elevation of a part of the breast strap with the tug in position.

The harness attachment or draft equalizer, shown in the form of a hame tug, may be employed in the ordinary form of harness, but, as previously stated, it is designed more particularly for employment with means whereby an animal may be quickly hitched to, or unhitched from a vehicle, the device herein disclosed operating to relieve the shoulders of the animal from sudden jerks and shocks incident to devices of this character.

Figure 5:
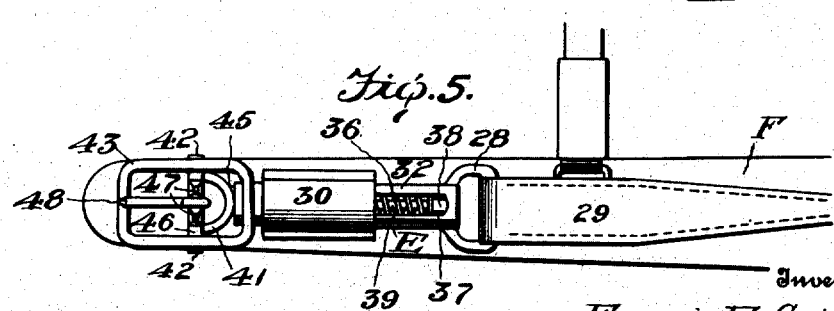

The device illustrated in Figs. 1, 2, and 3, in connection with a hame tug, and that shown in Figs. 4 and 5 in connection with a breast strap, F, are of substantially the same construction with the exception that the breast strap equalizer E, is preferably constructed smaller than the hame tug D, and also that the loop 21 for connecting the hame tug to the member 22 of the hame 23, is shown provided with means whereby it may be disconnected at one side (as illustrated in Fig. 2), to permit the same to pass through the aperture 24 in the member 22 and thereafter be firmly secured in position. One securing means is illustrated in the form of the upstanding lug 25, formed on the projection 26, which lug is adapted to pass through the hole 27 in the loop 21, and to be upset upon the outer surface of the loop, thereby forming a permanent connection between the hame 23 and the tug D. In the breast strap equalizer, E, however, the loop 28, is shown substantially rectangular in form and integral with the body of the equalizer. This loop 28 is adapted to receive a strap 29 of the breast strap to hold the same against longitudinal displacement. A loop 30, shown substantially circular in cross section, and which is preferably made of leather, is fastened on the breast strap, F, and adapted to receive a portion of the attachment, E, for the purpose of retaining the same in proper alinement with respect to the remaining portions of the harness.

In practice the hame tug, D, is preferably covered with leather, which is shown retained in place by the lug 31 formed on the loop 21. The leather covering is preferred for the reason that it prevents the engagement of the metal portions of the device with the skin of the animal.

The attachment, or draft equalizers, D, E, comprise a barrel or casing, 32, shown in the drawings provided with two pairs of slots 33, and 34, and also with a stop member 35 positioned between a pair of slots. The upper end of the casing 32 is left open to permit of the insertion of a spring 36. This spring 36, is adapted to bear against the closed end of the casing 32. To retain the spring securely within the casing 32, there is provided a nut 37, shown more clearly in Fig. 3. This nut is provided with radial guide members 38 shown in the form of ears, which members 38 are adapted to project through the slots 33 when the nut is pressed into engagement with the spring 36.

A draft rod 39 is employed and shown passed through an opening 44 in one end 45 of the casing 32, which rod is connected to the nut 37 by any suitable means. In Fig. 7, the rod 39 is shown threaded at one end 40, to engage the nut, while at the other end there is provided a forked shaped loop 41 having projections 42 formed thereon for the reception of a buckle 43, which is preferably pivotally mounted thereon. The compression of spring 36 is produced by the downward movement of the draft rod 39, which carries with it the nut 37 having the guide members 38. These members 38 ride in the elongated slot 33 and operate to prevent the jamming and breaking of the spring 36 by coming into contact with the stop 35, thereby limiting the compressing movement of the spring. Moreover, this construction locks the nut 38 into position and prevents its accidental displacement.

The forked shaped loop 41, carrying the pivotal buckle 43, is shown provided with a cross-bar 46 spanning the forked portion of the loop. On the under side of this cross-bar are small lugs 47 serving as means for retaining the tongue 48 of the buckle in position. It will be noted that substantially the entire load will be imposed directly upon the end of the draft rod 39.

The buckle 43 is preferably curved, as shown, with the ears 49 extending downwardly, thereby allowing the connecting strap to engage the buckle and pass on a plane above that of the loop 41. This feature permits of easy and quick adjustment of the parts.

While the construction herein shown and described is the preferred embodiment of the invention, it is obvious that various changes may be made in the device within the scope of the appended claims.

Having thus described my invention, what I claim as new and desire to secure by Letters Patent, is:—

1. A device of the class described comprising a draft rod terminating at one end thereof in a forked shaped portion, a cross-bar extending transversely of said forked shaped portion and integral therewith, adapted to pivotally engage the sides of a buckle, said cross bar being provided with lugs to engage the tongue of a buckle and retain the same against accidental displacement.

2. A draft rod composed of a single piece of metal formed to produce an elongated shank and a substantially semi-circular shaped loop at one end thereof, said loop being provided with a transversely arranged cross-bar having a plurality of integral lugs adapted to retain a tongue of a buckle against displacement and pivotally mounted on said cross-bar between the lugs, said loop being provided also with a plurality of integral projections for pivotally mounting the buckle.

In testimony whereof, I affix my signature, in presence of two witnesses.

FRANCIS E. GRIFFETH.

Witnesses:
J. H. GRIFFETH, Jr.,
W. G. GRIFFETH.

Copies of this patent may be obtained for five cents each, by addressing the "Commissioner of Patents, Washington, D. C."